UNITED STATES PATENT OFFICE.

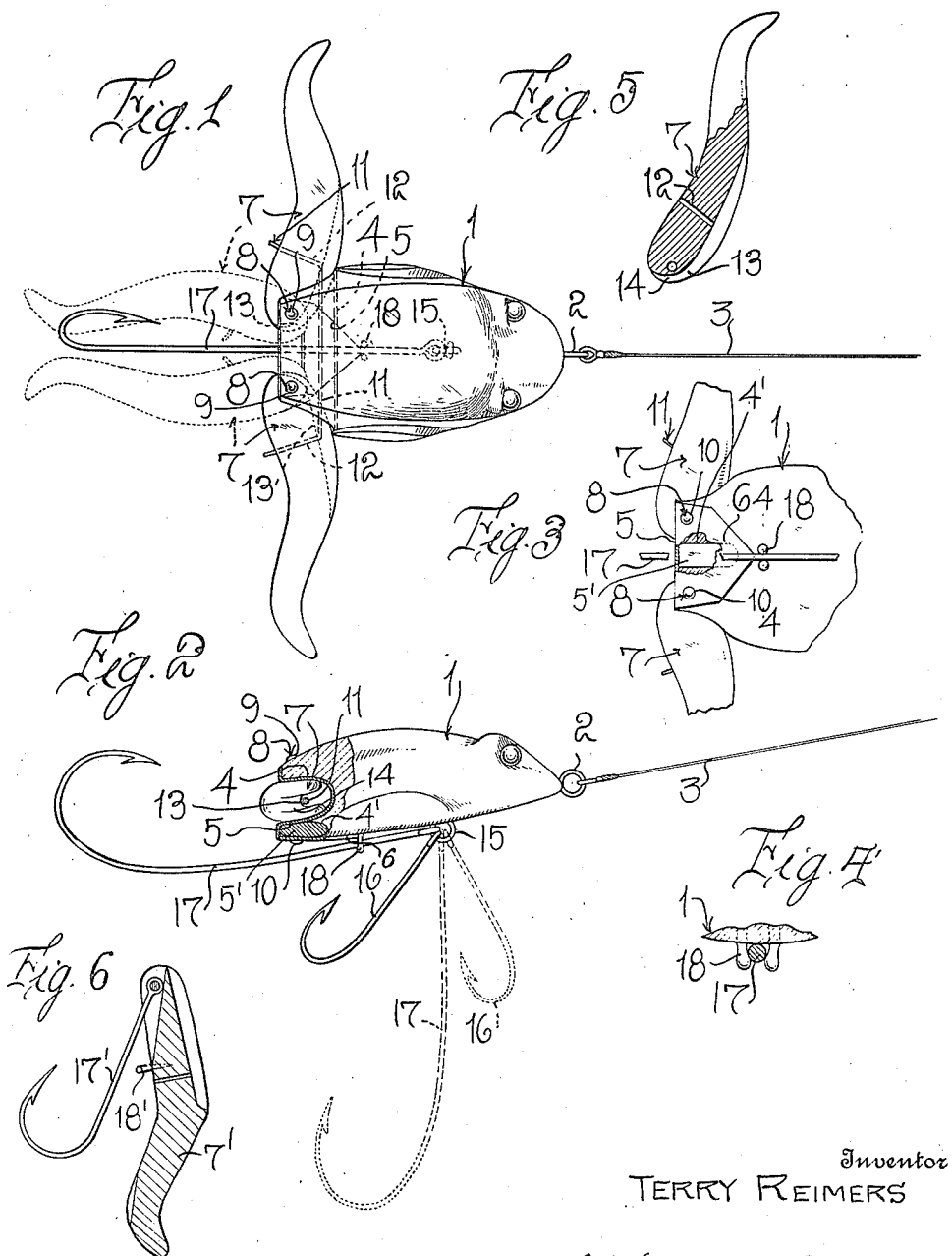

TERRY REIMERS, OF OMAHA, NEBRASKA.

ARTIFICIAL BASS-BAIT OR FROG.

1,239,724.         Specification of Letters Patent.     Patented Sept. 11, 1917.

Application filed February 1, 1917. Serial No. 145,923.

*To all whom it may concern:*

Be it known that I, TERRY REIMERS, a citizen of the United States, residing at Omaha, in the county of Douglas and State of Nebraska, have invented certain new and useful Improvements in Artificial Bass-Baits or Frogs, of which the following is a specification, reference being had to the accompanying drawings.

This invention comprehends certain new and useful improvements in artificial bait and relates particularly to a frog for use in fishing for bass or other game fish.

The invention has for its primary object a practical, durable and efficient construction of device of this character, which will float and which as it is drawn through the water by the fisherman will simulate all of the movements of a live frog and thereby constitute an effective lure for the fish.

A further object of the invention is an improved device of this character in which the parts are so constructed and arranged that the movable or pivoted legs will not be liable to become detached from the body portion of the frog or bait and wherein the recess in which the pivoted ends of the legs are mounted is lined with metal so arranged as to constitute a weight for the frog whereby it will always float in proper position, that is, right side up, and whereby the pivot pins which extend through the recessed portion of the body and through the legs, will not be liable to be pulled out as the pins extend through the metal lining and are reinforced thereby, the pins being preferably riveted or upset at one end upon one portion of the lining.

The invention has for a still further object an improved artificial frog or bait in which the legs are formed with longitudinal grooves receiving the elastic connecting member that tends to draw the legs apart, said grooves and the manner in which the ends of the elastic connecting member are secured to the legs permitting the tension to come on the full length of the rubber or other elastic member instead of merely upon that portion of the rubber that reaches across the upper part of the legs, said grooves also facilitating the reaction of the legs, against the water as the frog is drawn upwardly therethrough and thereby facilitating in the swimming movement or simulation thereof.

A still further object of the invention is an improved device of this type, in which the elastic and contractile connecting member for the legs is adjustably connected thereto at its ends in a very simple manner so that the tension may be varied as desired.

The invention has for a still further object an improved device of this kind which is provided with a rearwardly extending or tail hook and a catch designed to hold said hook in a predetermined position, until struck by the fish, at which time the said hook will be very easily detached from the catch and permitted to move freely in various directions on the loop or eye to which it is connected at one end.

Another object of the invention is a device of this kind which is so constructed and arranged that a practically weedless bait is produced which is a desideratum in devices of this kind as is well known to those familiar with the art to which this invention appertains.

And the invention also aims to generally improve devices of this class so as to render them more useful and commercially desirable.

With these and other objects in view, as will more fully appear as the description proceeds, the invention consists in certain constructions, arrangements and combinations of the parts that I shall hereinafter more fully describe and claim.

For a full understanding of the invention, reference is to be had to the following description and accompanying drawing, in which—

Figure 1 is a top plan view of an artificial bait or frog embodying the improvements of my invention.

Fig. 2 is a side elevation thereof,

Fig. 3 is a bottom plan view of a portion of the device,

Fig. 4 is a fragmentary detail view illustrating the means for normally holding one of the hooks in a predetermined position.

Fig. 5 is a detail view of one of the legs partly in elevation and partly in section, and Fig. 6 is a detail view illustrating a modified arrangement of tail hook which may be used.

Corresponding and like parts are referred to in the accompanying drawing and illustrated in all of the views of the accompanying drawing by like reference characters.

Referring to the drawing, the numeral 1 designates the body portion of my improved frog, said body portion in the present instance having an eye 2 secured to the nose thereof for the attachment of the line 3.

The body portion 1 is formed at its rear end with a rearwardly facing and transversely extending recess 4, in which a preferably metal lining 5 is fitted, said lining being formed with an extension which extends over the belly of the device, as indicated at 6. The recess 4 is intersected by a longitudinally extending slot 4', and a weight 5' is detachably held in said slot and retained therein by the extension 6 of the lining 5, so as to maintain the device in proper position, right side up, in the water. The weight may be changed, as desired, so as to replace one weight by a lighter or heavier one, according to the requirements of the case. For example, some fishermen may want to fish under water and would like to have the frog sink, in which event, manifestly, they may use a relatively heavy weight. 7 designates the preferably bowed legs of the device, the legs and the body portion 1 being formed of wood or some other buoyant substance or material whereby the frog may float. The legs 7 are connected to the body portion 1 by means of pivot pins 8 which extend through the legs and across the recess 4, said pins being provided at one end with heads 9 and at the other ends being riveted or upset as indicated at 10, against the extension or weight 6, whereby the lining 5 not only constitutes a reinforce to prevent the pins from readily pulling out and presents a smooth surface for the legs to operate upon, but also constitutes a washer for the riveted or upset ends of the pins to preclude the possibility of the latter being accidentally pulled out.

11 designates an elastic connecting member which is preferably composed of a piece of rubber, the ends of said connecting member being frictionally held in an adjustable manner in openings 12 in the legs near the pivoted ends thereof and said connecting member being received in grooves 13 formed in the outer sides of the legs, said grooves having end extensions 14 as shown, whereby the tension of the rubber connecting member 11 comes on the full length of the rubber instead of that portion thereof that reaches across the upper portion of the legs if the grooves were not provided, said grooves also serving to catch the water when the frog is drawn forwardly therethrough so as to facilitate the operation of the legs and simulate the movements of a live frog swimming.

The body portion 1 is preferably provided on its lower side with a hook attaching loop or eye 15 from which a hook 16 is suspended, said hook being a single, double or treble hook, as desired, and being termed herein a body hook to distinguish it from the tail hook 17 which is also preferably pivotally connected at its eye end to the loop 15. Preferably the tail hook 17 is normally engaged in a catch 18 secured to the belly of the frog at the rear of the loop 15, said catch in the present embodiment of the invention consisting of pins designed to frictionally hold the shank of the hook 17 between them whereby the hook will be normally maintained extending longitudinally and rearwardly along and from the body and between the legs 7, and a practically weedless bait being produced, without the necessity of closing the bill or bar of the hook. When the fish strikes short and the body hook 16 fails to catch it, the rear hook will come into play so that it will be seen that the device will operate whether the fish strikes hard or short, the tail hook 17 being readily disengaged from the catch 18 when taken by the fish so that it may subsequently move freely in all directions relative to the body portion and legs while the fish is being played and brought in.

My improved frog is so constructed that it is buoyant as hereinbefore indicated, and the weight in the reinforcing lining for the recess 4 is such as to hold the frog in an angular position in the water with the legs down, whereby the water will carry the legs to a spread position, this operation being facilitated in its inception by the rubber connecting member 11. Preferably the parts are so arranged that there is no tension on this connection member until the legs come down half-way between the fully spread position and the straight-out position, and by having no tension on the rubber connecting member when the legs come up half-way to the fully-spread position, it is obvious that the legs will have a free motion without any resistance whatever, to swing back and forth, which every small ripple or wave on the water will cause them to do and which imitates the live frog exactly when floating in a ripple or waves.

If desired, a leg of the kind illustrated in Fig. 6 may be employed, the same being here designated 7'. In this event the tail hook 17 is not employed, but in lieu thereof the tail hook 17' is used, said hook having its eye pivotally mounted on the same pin which secures the leg 7' in place and being normally held in a longitudinal position by means of a catch 18'. It will be evident that there is never any strain or pull upon the leg 7', as this comes directly on the hook, and said pin when the fish is hooked, the hook 17' like the hook 17, being readily disengageable from the catch when the fish strikes and swings freely upon the pin.

While the accompanying drawing illustrates what I believe to be the preferred embodiment of my invention, it is to be understood that the invention is not limited thereto, but that various changes may be made in the construction, arrangements and proportions of the parts without departing from the scope of the invention as claimed.

What is claimed, is:

1. An artificial bait of the character described comprising a body portion, legs pivotally connected thereto, said legs outwardly of their pivotal connection with the body being provided with openings and an elastic member connecting said legs and having its extremities frictionally held within the openings of the legs, said elastic member being free of tension after the member has drawn the legs substantially to half way of a fully spread position.

2. An artificial bait of the character described comprising a body portion, legs pivotally connected thereto, and an elastic member connecting each of the legs and the body and tending to swing the leg outwardly, said elastic member being free of tension after the member has drawn the legs substantially to half way of a fully spread position.

3. An artificial bait of the character described comprising a body portion, legs pivotally connected thereto, said legs outwardly of their pivotal connection with the body being provided with openings and an elastic member connecting said legs and having its extremities frictionally held within the openings of the legs, said elastic member being free of tension after the member has drawn the legs substantially to half way of a fully spread position, the outer sides of the legs being provided at their pivoted end portions with grooves to receive the elastic member.

In testimony whereof I hereunto affix my signature in the presence of two witnesses.

TERRY REIMERS.

Witnesses:
W. E. RHOADES,
C. F. BRINKMAN.